United States Patent
Daudet et al.

(10) Patent No.: US 10,087,617 B2
(45) Date of Patent: Oct. 2, 2018

(54) DRIFT CLIP

(71) Applicants: Larry Randall Daudet, Brentwood, CA (US); Hien Nguyen, San Ramon, CA (US)

(72) Inventors: Larry Randall Daudet, Brentwood, CA (US); Hien Nguyen, San Ramon, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 15/411,829

(22) Filed: Jan. 20, 2017

(65) Prior Publication Data

US 2017/0204600 A1 Jul. 20, 2017

Related U.S. Application Data

(60) Provisional application No. 62/281,144, filed on Jan. 20, 2016.

(51) Int. Cl.
| | | |
|---|---|---|
| *E04B 1/36* | (2006.01) | |
| *E04B 1/41* | (2006.01) | |
| *E04B 1/98* | (2006.01) | |
| *E04B 1/24* | (2006.01) | |
| *E04B 1/38* | (2006.01) | |

(52) U.S. Cl.
CPC .............. *E04B 1/36* (2013.01); *E04B 1/2403* (2013.01); *E04B 1/40* (2013.01); *E04B 1/98* (2013.01); *E04B 2001/2415* (2013.01); *E04B 2001/2439* (2013.01); *E04B 2001/405* (2013.01)

(58) Field of Classification Search
CPC . E04B 1/2403; E04B 1/36; E04B 2/88; E04B 1/98; E04B 1/40; E04B 2001/2415; E04B 2001/2439; E04B 2001/405; F16M 13/02
See application file for complete search history.

(56) References Cited

U.S. PATENT DOCUMENTS

| | | | |
|---|---|---|---|
| 1,729,935 | A | 10/1929 | Froehlich |
| 2,065,529 | A | 12/1936 | Kehr et al. |
| 2,218,426 | A | 10/1940 | Hurlbert, Jr. |
| 2,365,478 | A | 12/1944 | Grotta |
| 3,003,600 | A | 10/1961 | MacKenzie |

(Continued)

FOREIGN PATENT DOCUMENTS

| | | |
|---|---|---|
| WO | WO-96/31667 A1 | 10/1996 |
| WO | WO 98/51889 | 11/1998 |

OTHER PUBLICATIONS

Schafer, B.W., et al., "Accommodating Building Deflections: What every EOR should know about accommodating deflections in secondary cold-formed steel systems." NCSEA/CASE/SEI, Structure Magazine, Apr. 2003, Chicago.

(Continued)

*Primary Examiner* — Rodney Mintz
(74) *Attorney, Agent, or Firm* — James R. Cypher; Charles R. Cypher

(57) ABSTRACT

An improved connection between supported and supporting structural members, particularly for use in structures where the supported member needs to move with respect to the supporting member. The connector includes a mounting clip and one or more sliders receiving in one or more openings in the mounting clip.

20 Claims, 13 Drawing Sheets

(56) References Cited

U.S. PATENT DOCUMENTS

| | | | | |
|---|---|---|---|---|
| 3,038,568 | A | 6/1962 | Morgan | |
| 3,321,880 | A | 5/1967 | Ferrell et al. | |
| 3,490,797 | A | 1/1970 | Platte | |
| 3,537,219 | A | 11/1970 | Navarre | |
| 3,715,850 | A | 2/1973 | Chambers | |
| 3,798,865 | A | 3/1974 | Curtis | |
| 3,805,465 | A | 4/1974 | Dietrich | |
| 3,972,168 | A | 8/1976 | Allen | |
| 4,067,168 | A | 1/1978 | Thurner | |
| 4,121,391 | A | 10/1978 | Schroeder | |
| 4,140,294 | A | 2/1979 | Zwarts | |
| 4,433,524 | A | 2/1984 | Matson | |
| 4,570,400 | A | 2/1986 | Slager et al. | |
| 4,594,017 | A | 6/1986 | Hills | |
| 4,665,672 | A | 5/1987 | Commins et al. | |
| 4,717,279 | A | 1/1988 | Commins | |
| 4,796,403 | A | 1/1989 | Fulton et al. | |
| 4,819,401 | A | 4/1989 | Whitney, Jr. | |
| 4,825,621 | A | 5/1989 | Jensen | |
| 4,843,776 | A | 7/1989 | Guignard | |
| 4,890,436 | A | 1/1990 | Colonias | |
| 4,897,979 | A | 2/1990 | Colonias | |
| 4,917,403 | A | 4/1990 | Gyoda et al. | |
| 4,936,182 | A | 6/1990 | Bunker | |
| 4,949,929 | A | 8/1990 | Kesselman et al. | |
| 4,967,929 | A | 11/1990 | Turner | |
| 5,027,494 | A | 7/1991 | Martin | |
| 5,048,243 | A * | 9/1991 | Ward | E04H 3/02 52/167.4 |
| 5,092,097 | A | 3/1992 | Young | |
| 5,113,631 | A | 5/1992 | diGirolamo | |
| 5,127,760 | A | 7/1992 | Brady | |
| 5,216,858 | A | 6/1993 | Gilmour | |
| 5,249,404 | A | 10/1993 | Leek et al. | |
| 5,259,685 | A | 11/1993 | Gilb | |
| 5,265,396 | A | 11/1993 | Amimoto | |
| 5,313,752 | A | 5/1994 | Hatzinikolas | |
| 5,323,577 | A | 6/1994 | Whitmyer | |
| 5,328,287 | A | 7/1994 | Gilb | |
| 5,333,435 | A | 8/1994 | Leek | |
| 5,402,612 | A | 4/1995 | diGirolamo | |
| 5,467,566 | A * | 11/1995 | Swartz | E04B 2/96 52/235 |
| 5,467,570 | A | 11/1995 | Leek | |
| 5,471,805 | A | 12/1995 | Becker | |
| 5,555,694 | A | 9/1996 | Commins | |
| 5,572,844 | A | 11/1996 | Stackenwalt et al. | |
| 5,577,860 | A | 11/1996 | Plank | |
| 5,611,179 | A | 3/1997 | Leek | |
| 5,640,823 | A | 6/1997 | Bergeron et al. | |
| 5,664,392 | A | 9/1997 | Mucha | |
| 5,671,580 | A | 9/1997 | Chou | |
| 5,689,922 | A | 11/1997 | Daudet | |
| 5,720,465 | A | 2/1998 | Peltzer | |
| 5,720,571 | A * | 2/1998 | Frobosilo | E04B 2/96 403/2 |
| 5,755,066 | A | 5/1998 | Becker | |
| 5,846,018 | A * | 12/1998 | Frobosilo | E04B 2/96 403/2 |
| 5,876,006 | A * | 3/1999 | Sharp | E04B 1/2403 248/297.21 |
| 5,904,023 | A | 5/1999 | diGirolamo et al. | |
| 5,906,080 | A * | 5/1999 | diGirolamo | E04B 2/7453 411/546 |
| 5,913,788 | A | 6/1999 | Herren | |
| 5,937,605 | A | 8/1999 | Wendt | |
| 5,979,130 | A | 11/1999 | Gregg et al. | |
| 5,983,589 | A | 11/1999 | Daudet | |
| 6,058,668 | A | 5/2000 | Herren | |
| 6,088,982 | A | 7/2000 | Hiesberger | |
| 6,112,495 | A | 9/2000 | Gregg et al. | |
| 6,158,188 | A | 12/2000 | Shahnazarian | |
| 6,199,929 | B1 | 3/2001 | Hansch | |
| 6,213,679 | B1 * | 4/2001 | Frobosilo | E04B 2/82 403/14 |
| 6,230,466 | B1 | 5/2001 | Pryor | |
| 6,301,854 | B1 | 10/2001 | Daudet et al. | |
| 6,430,890 | B1 | 8/2002 | Chiwhane et al. | |
| 6,591,562 | B2 | 7/2003 | Ting | |
| 6,598,361 | B2 | 7/2003 | Ting | |
| 6,612,087 | B2 * | 9/2003 | diGirolamo | E04B 2/767 403/403 |
| 6,668,510 | B2 | 12/2003 | McManus | |
| 6,688,069 | B2 * | 2/2004 | Zadeh | E04B 1/2403 52/712 |
| 6,691,482 | B1 | 2/2004 | Ault | |
| 6,698,971 | B1 | 3/2004 | Wilhelmi | |
| 6,701,689 | B2 | 3/2004 | diGirolamo | |
| 6,719,481 | B2 | 4/2004 | Hoffmann | |
| 6,748,705 | B2 | 6/2004 | Orszulak et al. | |
| 6,792,733 | B2 | 9/2004 | Wheeler et al. | |
| 6,799,407 | B2 | 10/2004 | Saldana | |
| 6,843,035 | B1 | 1/2005 | Glynn | |
| 6,854,237 | B2 | 2/2005 | Surowiecki | |
| 6,871,470 | B1 | 3/2005 | Stover | |
| 6,883,785 | B1 | 4/2005 | Knapp | |
| 7,104,024 | B1 * | 9/2006 | diGirolamo | E04B 2/767 403/231 |
| RE39,462 | E | 1/2007 | Brady | |
| 7,174,690 | B2 * | 2/2007 | Zadeh | E04B 1/2403 52/712 |
| 7,225,590 | B1 | 6/2007 | diGirolamo et al. | |
| 7,293,393 | B2 | 11/2007 | Kelly et al. | |
| 7,299,593 | B1 | 11/2007 | diGirolamo et al. | |
| 7,451,573 | B2 | 11/2008 | Orszulak et al. | |
| 7,478,508 | B2 * | 1/2009 | Peterson | E04B 2/96 248/300 |
| 7,503,150 | B1 * | 3/2009 | diGirolamo | E04B 2/96 403/403 |
| 7,520,100 | B1 | 4/2009 | Herrman et al. | |
| 7,533,508 | B1 * | 5/2009 | diGirolamo | E04L 32/58 248/300 |
| 7,559,519 | B1 | 7/2009 | Dragic et al. | |
| 7,596,921 | B1 | 10/2009 | diGirolamo et al. | |
| 7,617,643 | B2 | 11/2009 | Pilz et al. | |
| 7,634,889 | B1 | 12/2009 | diGirolamo et al. | |
| 7,640,701 | B2 | 1/2010 | Rutherford | |
| 7,644,549 | B2 | 1/2010 | Speck | |
| 7,681,365 | B2 | 3/2010 | Klein | |
| 7,716,899 | B2 | 5/2010 | Beck et al. | |
| 7,735,295 | B2 | 6/2010 | Surowiecki | |
| 7,739,850 | B2 | 6/2010 | Daudet | |
| 7,752,817 | B2 | 7/2010 | Pilz et al. | |
| 7,788,878 | B1 | 9/2010 | diGirolamo et al. | |
| D644,503 | S * | 9/2011 | Crane | D8/354 |
| 8,091,316 | B2 | 1/2012 | Beck et al. | |
| 8,181,419 | B1 * | 5/2012 | diGirolamo | E04B 2/768 248/909 |
| 8,387,321 | B2 | 3/2013 | diGirolamo et al. | |
| 8,511,032 | B2 * | 8/2013 | Abdel-Rahman | E04B 2/88 248/228.1 |
| 8,555,592 | B2 * | 10/2013 | Daudet | E04B 1/2403 52/489.1 |
| 9,115,489 | B2 * | 8/2015 | Bourdon | E04B 2/90 |
| D814,905 | S * | 4/2018 | Ralph | D8/349 |
| D815,313 | S * | 4/2018 | Ralph | D25/199 |
| D815,314 | S * | 4/2018 | Ralph | D25/199 |
| D815,315 | S * | 4/2018 | Ralph | D25/199 |
| D815,316 | S * | 4/2018 | Ralph | D25/199 |
| RE46,844 | E * | 5/2018 | diGirolamo | |
| D817,149 | S * | 5/2018 | Ralph | D8/349 |
| 2002/0023405 | A1 * | 2/2002 | Zadeh | E04B 1/2403 52/714 |
| 2002/0062617 | A1 * | 5/2002 | diGirolamo | E04B 2/767 52/688 |
| 2004/0118075 | A1 * | 6/2004 | Zadeh | E04B 1/2403 52/715 |
| 2005/0086905 | A1 | 4/2005 | Ralph et al. | |
| 2005/0284041 | A1 * | 12/2005 | Chen | F16M 7/00 52/167.5 |

(56) References Cited

U.S. PATENT DOCUMENTS

| | | | | |
|---|---|---|---|---|
| 2006/0032180 | A1* | 2/2006 | Peterson | E04B 2/96 52/712 |
| 2006/0096192 | A1 | 5/2006 | Daudet | |
| 2006/0185311 | A1* | 8/2006 | Attalla | E04B 7/045 52/639 |
| 2006/0260259 | A1 | 11/2006 | Morse | |
| 2009/0173036 | A1 | 7/2009 | Hand | |
| 2009/0193750 | A1* | 8/2009 | Klima | E04B 2/96 52/712 |
| 2012/0247059 | A1* | 10/2012 | Daudet | E04B 1/2403 52/705 |
| 2013/0139466 | A1* | 6/2013 | Abdel-Rahman | E04B 2/88 52/655.1 |
| 2015/0068153 | A1* | 3/2015 | Bourdon | E04B 2/90 52/702 |
| 2017/0044787 | A1* | 2/2017 | di Girolamo PE | E04H 9/021 |
| 2017/0204599 | A1* | 7/2017 | Daudet | E04B 1/2403 |
| 2018/0066424 | A1* | 3/2018 | Daudet | E04B 1/40 |
| 2018/0066425 | A1* | 3/2018 | Ralph | E04B 1/2403 |
| 2018/0135293 | A1* | 5/2018 | Daudet | E04B 1/2403 |

OTHER PUBLICATIONS

"International Search Report and The Written Opinion of the International Searching Authority," PCT/US2012/030963, dated Jul. 30, 2012, 6 pages.
"Curtainwall Deflection Solutions," Super Stud Building Products, Inc. Product Catalog, 2001, 24 pages including front cover. Super Stud Building Products, Inc., Edison.
"Redi Klip Submittal: Head-of-Wall Positive Attachment Deflection Clip," Total Steel Solution, as early as May 22, 2013, 2 pages, USA.
"Posi Klip Product Information: Head-of-Wall Positive Attachment Deflection Clip," FireTrak Corporation, as early as May 22, 2013, 1 page, USA.
"Sliptrack Systems: Slotted Deflections Track Systems for Interior and Exterior Walls," SlipTrack Systems, 2003, 6 pages. Dietrich Metal Framing: A Worthington Industries Company, USA.
"TSN Products: Steel framing products," The Steel Network TSN website, 2010, 2 pages. The Steel Network, Inc., USA.
"TSN Product: VertiClip® SLB," The Steel Network TSN website, Dec. 26, 2012, 2 pages, The Steel Network, Inc., USA.
"Priceless Steel Products Clip Central," Priceless Steel Products Website, Aug. 30, 2010, 2 pages. Scafco Steel Stud Manufacturing Co., WA.
"Bypass Slab Slip Clip: PLC2," Priceless Steel Product Catalog, as early as May 22, 2013, p. 12-13. Scafco Steel Stud Manufacturing Co., WA.
"SLP-TRK® Slotted Track (BDTK)," "Head of Wall," SlipTrack Systems, as early as Jul. 2010, p. 26-29. Dietrich Metal Framing: A Worthington Industries Company, USA.
"Curtainwall Deflection Solutions," Buy Super Stud Website, Aug. 2010, 2 pages. Super Stud Building Products, Inc., Edison.
"Curtain Wall Systems", "Jam Stud Introduction", "Design Considerations", "Header/Sill Solutions", "Connections", "VertiClip: Vertical Deflection Connectors", "DriftClip and DriftTrk: Vertical Deflection and Lateral Drift", "Bridging", "Design Software," TSN The Steel Network Product Catalog, May 2009, cover page, p. 1, 4,18, 30-33, 35, 36, back cover. The Steel Network, Inc., USA.
Search Report for European Patent Appl. 17152308.7, dated Aug. 17, 2017, 9 pages, European Patent Office, Munich, Germany.
"DWSC Seismic Clip," Brochure, as early as Aug. 21, 2014, Marino\WARE, South Plainfield, New Jersey.
"Single Slip Clip Detail," Disclosure, Aug. 12, 2011, 1 page, Olmar Supply Inc., Livermore, California.
"Double Slip Clip Detail," Disclosure, Aug. 12, 2011, 1 page, Olmar Supply Inc., Livermore, California.
Office Action dated Nov. 24, 2017 in U.S. Appl. No. 15/405,125. Patent prosecution document. Dated Nov. 24, 2017. 15 pages. United States Patent and Trademark Office. Alexandria, Virginia.

\* cited by examiner

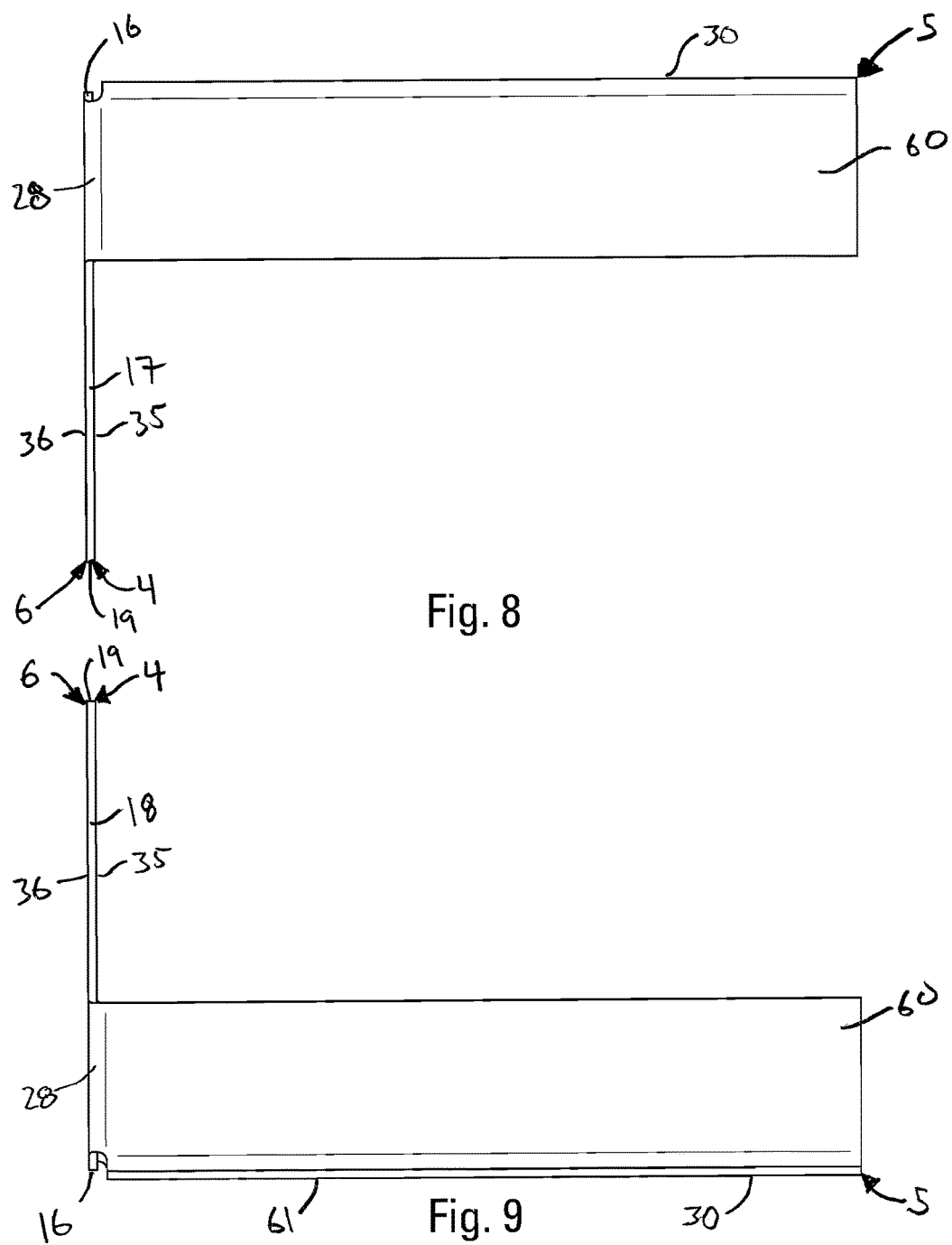

DRIFT CLIP

BACKGROUND OF THE INVENTION

The present invention belongs to a class of mounting clips that are useful in the construction of buildings, particularly commercial buildings where a non-load bearing, exterior curtain wall is connected to the load bearing elements of a building and the curtain wall needs to be able to move with respect to the load bearing elements.

It is often advantageous to attach curtain walls systems to the load bearing elements of a building with connectors that permit a degree of relative movement between the wall system and other components of the building. There are many reasons for this. For example there can be extreme differences in temperature between the exterior curtain walls and the interior load bearing systems, and because the exterior curtain wall and the load bearing system often have different coefficients of expansion based on their different materials, under extreme temperature differences the curtain wall wants to shift with respect to the load bearing system. Exterior walls of buildings are also subject to deflection from wind and seismic forces. Furthermore, curtain walls are typically not designed to support the vertical loads in the structure and must therefore by isolated from deflection of the primary load-bearing support structure of the building due to changes in live or dead loads carried by that structure. Providing a degree of freedom of movement within the wall and between the wall and the other components of a building can reduce stress and prevent fracture of connected parts due to the loading of the building, seismic and wind events, or differences in the temperatures of the curtain wall and the load bearing elements.

A number of clips that permit relative movement between structural members have been patented.

U.S. Pat. No. 5,467,566, issued in 1995 to Allan J. Swartz and Gregory A. Kulpa teaches a mounting clip that uses a fastener with a washer or spacer to allow for relative movement. The mounting clip is connected to the supported member and to the fastener with the washer in such a manner that the mounting clip can move with respect to the supported member. To allow relative movement between the fastener and the mounting clip, Swartz and Kulpa taught that the spacer or washer on the fastener should be received in slots in the portion of the mounting clip lying against the supported member and the spacer or washer should be thicker than the receiving portion of the mounting clip. Planar flaps or extensions which were part of the washer or spacer and disposed parallel to the receiving portion of the mounting clip extend over the receiving portion of the mounting clip and prevent it from pulling away.

U.S. Pat. No. 5,876,006, issued in 1999 to Terry L. Sharp and Richard C. Eldenburg also teaches a mounting clip where a spacer or fixed bracket is connected to the supported member and the mounting clip is attached to the supporting member and the fixed bracket in such a manner that the mounting clip can move with respect to the supported member. Like Swartz and Kulpa, to allow relative movement between the fixed bracket and the mounting clip, Sharp and Eldenburg taught that the fixed bracket should have an engaging component received by the portion of the mounting clip lying against the supported member that is thicker than the receiving portion of the mounting clip. Also, like Swartz and Kulpa, they taught that a planar securing component which is attached to the engaging component should extend in parallel relation over the receiving portion of the mounting clip. In Sharp and Eldenburg, their spacer or fixed bracket was a plate having a thickness that was greater than the portion of the mounting clip that received it, thus the securing component that projected outwardly from the top of the engaging component would not interfere with the movement of the mounting clip in the plane of the supporting member but keep it from pulling away.

Patents with similar teachings include U.S. Pat. No. 6,213,679, issued in 2001 to Frobosilo and Viola, and U.S. Pat. No. 5,906,080, issued in 1999 to diGirolamo and Mountcastle. U.S. Pat. No. 7,104,024, which issued in 2006 to diGirolamo et al, teaches having the spacers that allow for sliding motion of the mounting clip to also be connected to a u-shaped, reinforcing member that adds strength and rigidity to the connection.

The mounting clip of the present invention provides a uniquely shaped clip and slider that help to prevent the mounting clip from buckling under load.

BRIEF SUMMARY OF THE INVENTION

The present invention provides a drift clip that has a unique shape to avoid buckling of the clip under load.

The present invention provides a mounting clip that has a unique slider that is used in one or more elongated slots in the clip to provide improved rotational support to the mounting clip and thereby avoid buckling of the mounting clip. In one embodiment, the slider has a securing component, and the securing component has one or more generally planar upstanding flanges connected to and set at an angle to the one or more base components, such that a projection along the generally planar upstanding flange would intersect with the leg of the mounting clip to which it is attached. This tall flange disposed at an angle to the leg of the mounting clip to which it is attached improves the strength of the securing component.

The present invention provides a connection, including a supporting member, a supported member, and a connector. The connector attaches the supported member to the supporting member. The connector includes a mounting clip and one or more sliders and the mounting clip is retained with respect to the one or more sliders so that the mounting clip can move relative to the one or more sliders. The mounting clip has an anchored leg disposed in close proximity to the supported member. The anchored leg has a front surface and a back surface on opposite sides of the anchored leg with the back surface of the anchored leg facing the supported member. The anchored leg also has one or more openings. An anchoring leg is connected to the anchored leg and disposed in close proximity to the supporting member. The anchoring leg has a sliding surface and an interfacing surface on opposite sides of the anchoring leg with the interfacing surface of the anchoring leg facing the supporting member. The anchoring leg also has one or more openings.

The one or more sliders have one or more base components that are received in at least one of the one or more openings of the anchored leg and the one or more openings of the anchoring leg. The one or more openings that receive the one or more base components are larger than the one or more base components so that the one or more base components can move with respect to the one or more openings. Each of the one or more slides also has a securing component that is attached to the one or more base components. The securing component has one or more containment surfaces that are disposed in close proximity to at least one of the front surface of the anchored leg when the one or more base components are received in the one or more openings of the anchored leg and the sliding surface of the anchoring leg when the one or more base components are received in the one or more openings of the anchoring leg. The containment surfaces prevent the mounting clip from pulling away from either the supporting member or the supporting member, depending on which member is attached to the slider.

According to the present invention, the securing component can have one or more upstanding flanges connected to and set at an angle to the one or more base components extending substantially above the one or more base components.

According to the present invention, one or more fasteners connect the one or more sliders to at least one of the supporting member and the supported member.

According to the preset invention, the slider can be a unitary member.

According to the preset invention, the base members are elongated members with multiple points of contact along the one or more openings.

According to the preset invention, the one or more upstanding flanges have an outer edge and one or more bottom edges that are generally opposed to the outer edges and the containment surfaces are formed on the one or more bottom edges of the flanges.

According to the preset invention, the one or more bottom edges of the one or more flanges are interrupted by one or more projecting arms that extend to and connect the one or more upstanding flanges to the one or more base components. Preferably, the projecting arms are narrower than both the one or more base components and the one or more flanges.

According to the preset invention, the one or more upstanding flanges are formed with lateral bends or embossments to provide additional strength to the flanges.

According to the preset invention, the one or more upstanding flanges are generally parallel to each other, and the one or more upstanding flange are disposed generally orthogonally to the base components.

According to the preset invention, the mounting clip can be formed so that one of the anchoring leg and the anchored leg is a unitary member having opposed side edges and the other of the anchoring leg and the anchored leg is made of two overlapping members each of which is joined to one of the opposed side edges of the unitary member and are then bent so as to overlap.

According to the preset invention, each of the overlapping members is formed with a side flange that is connected to one of the opposed side edges of the unitary member at a bend line, and each of the overlapping members is formed with a back flange connected to the side flange at a bend line, and the back flanges overlap.

According to the preset invention, each of the back flanges are formed with one opening and the back flanges overlap in such a manner that a single opening is formed for receiving the one or more base members of the one or more sliders.

BRIEF DESCRIPTION OF THE DRAWINGS

FIG. 8 is a top view of the drift clip of FIG. 5.

FIG. 9 is a bottom view the drift clip of FIG. 5.

DETAILED DESCRIPTION OF THE INVENTION

Figure 1:
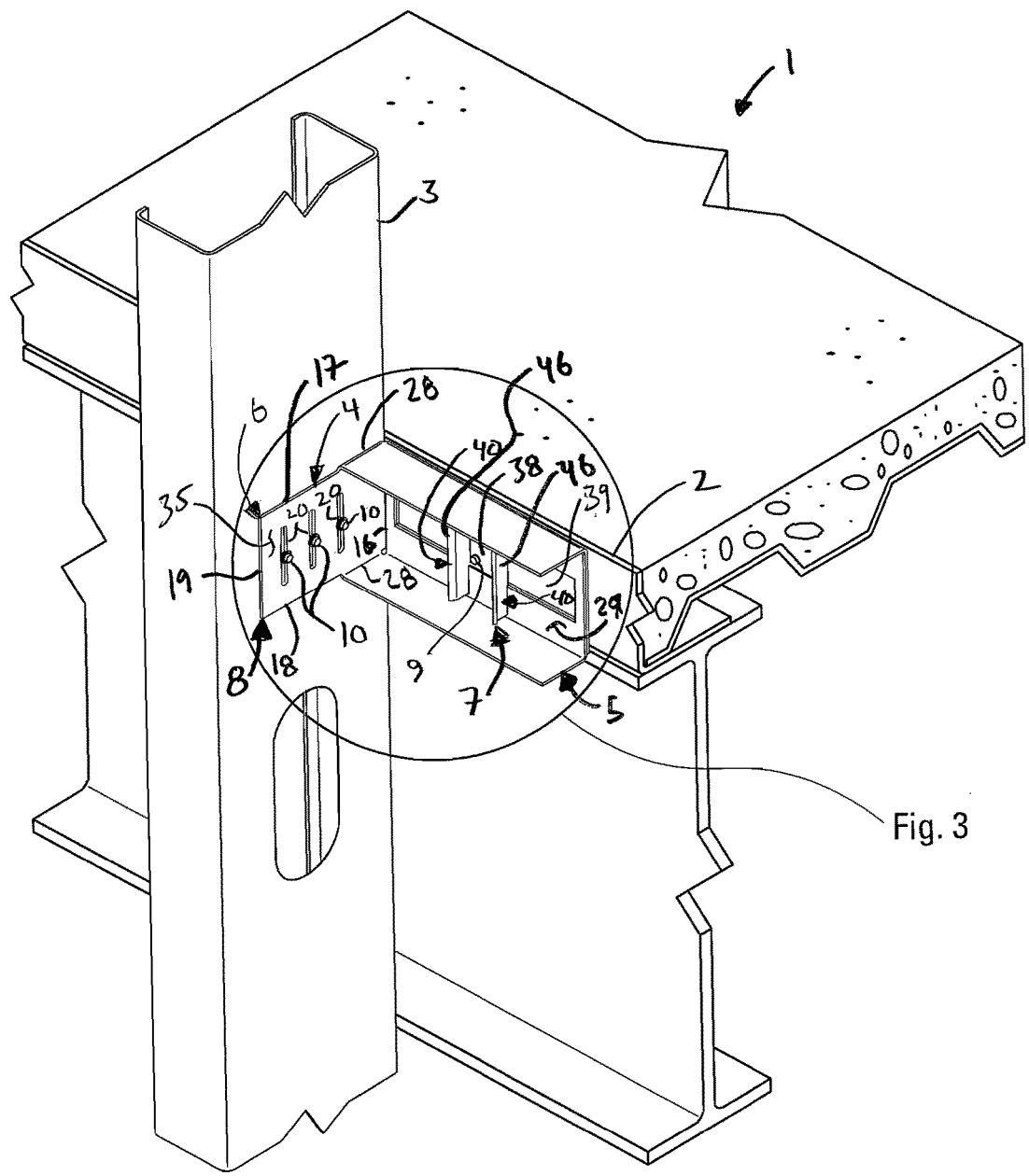
FIG. 1 is a perspective view of a connection formed according to the present invention.
Figure 2:
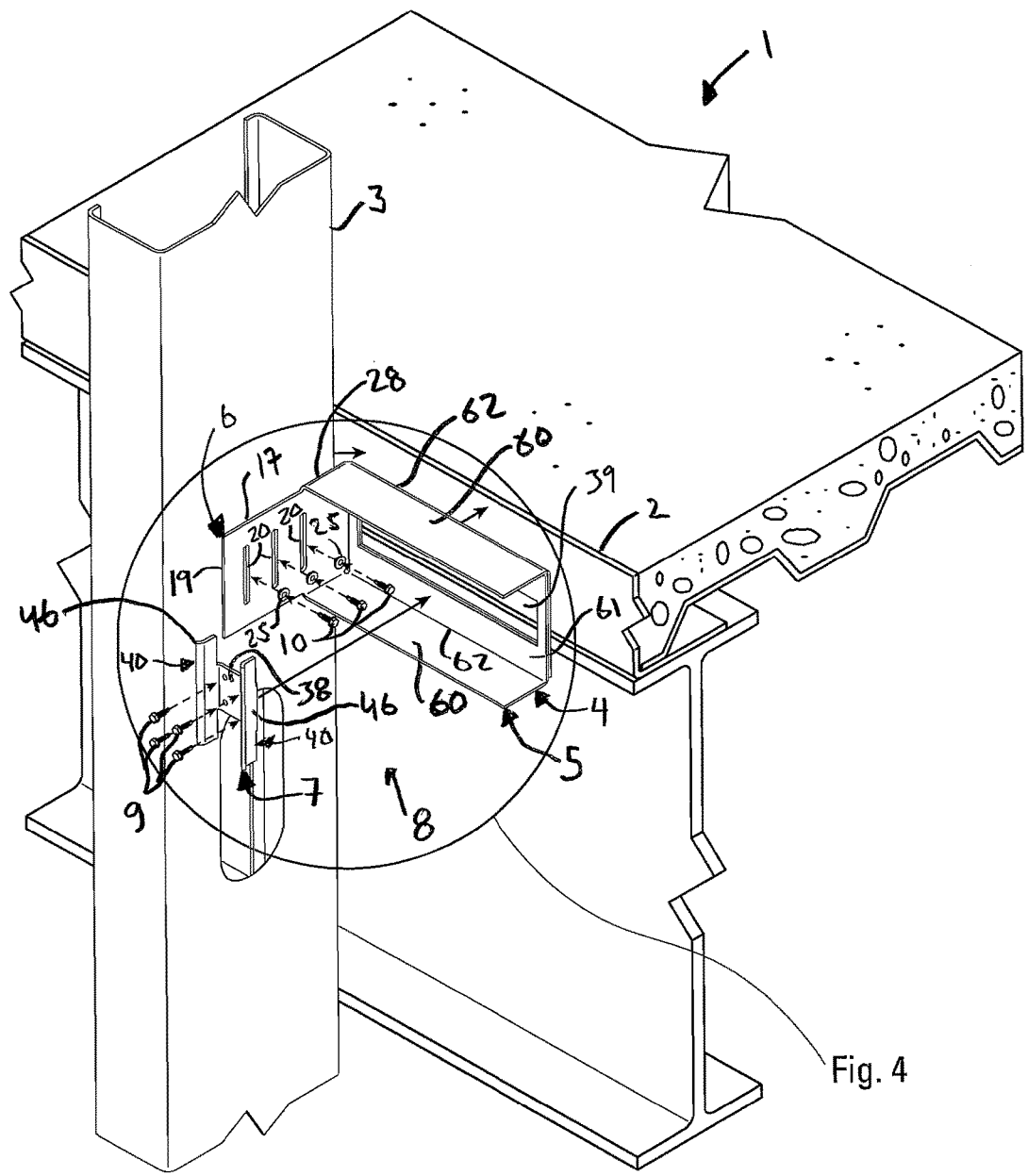
FIG. 2 is an exploded, perspective view of the connection of FIG. 1.
Figure 3:
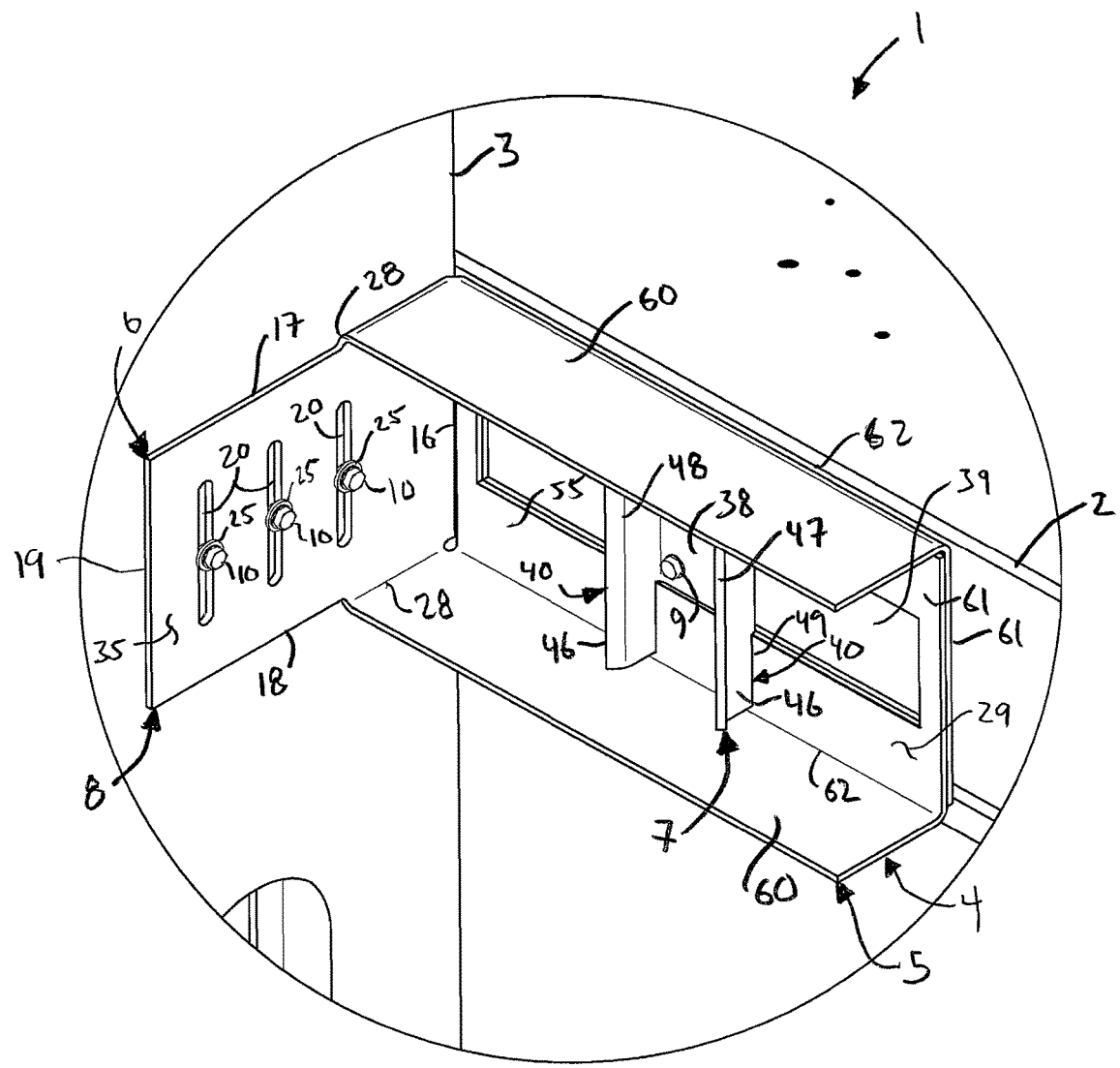
FIG. 3 is a detail perspective view of the connection of FIG. 1, taken along line FIG. 3 of FIG. 1.

The present invention is a structural connection 1 between a first building structural member or supporting member 2 and a second building structural member or supported member 3. As shown in FIG. 1, the supporting member 2 can be a horizontal beam and/or concrete flooring member 2 and the supported member 3 can be a vertically-oriented, channel-shaped wall stud 3.

The connection 1 between the supporting member 2 and the supported member 3 is made with the mounting clip 4 of the present invention. As shown in FIG. 1, the mounting clip 4 has an anchoring leg 5 fastened to the supporting member 2 and an anchored leg 6 connected to the supported member 3. Preferably, the anchoring leg 5 and the anchored leg 6 are generally planar and joined at right angles to each other. The connection 1 is also made with one or more sliders 7 that in combination with the mounting clip 4 make up the connector 8 of the present invention. The connection is also made with fasteners 9 that connect the slider 7 to either the supporting member 2 or the supported member 3, and fasteners 10 that connect the mounting clip 4 to either the supporting member 2 or the supported member 3. In the most common embodiments, the mounting clip 4 and slider 7 allow for relative movement between the supporting and the supported members 2 and 3. This is typically vertical movement, horizontal movement or a combination of vertical and horizontal movement between the supporting and the supported members 2 and 3 depending upon the features of the mounting clip 4. A change in orientation of the components of the connection 1 would allow the connector 8 to permit different relative movements between the components. The mounting clip 4 and the slider 7 are preferably made from cold formed sheet steel, bent, cut, embossed and punched on automated or semi-automated manufacturing machinery. As shown in the drawings, preferably, the supported member 3 is cold-formed steel structural members. Preferably, the supporting member 2 can be a concrete floor member or steel structural members, or a combination thereof.

As shown in FIG. 8, preferably, the anchored leg 6 has a substantially planar portion and the anchoring leg 5 has a substantially planar portion set orthogonally to the substantially planar portion of the anchored leg 6. If the connection is designed such that there will not be relative movement along one of the anchored leg 6 or the anchoring leg 5, then that leg can be attached by welds and other means of fixing the leg to the supporting or supported member 2 or 3.

Figure 5:
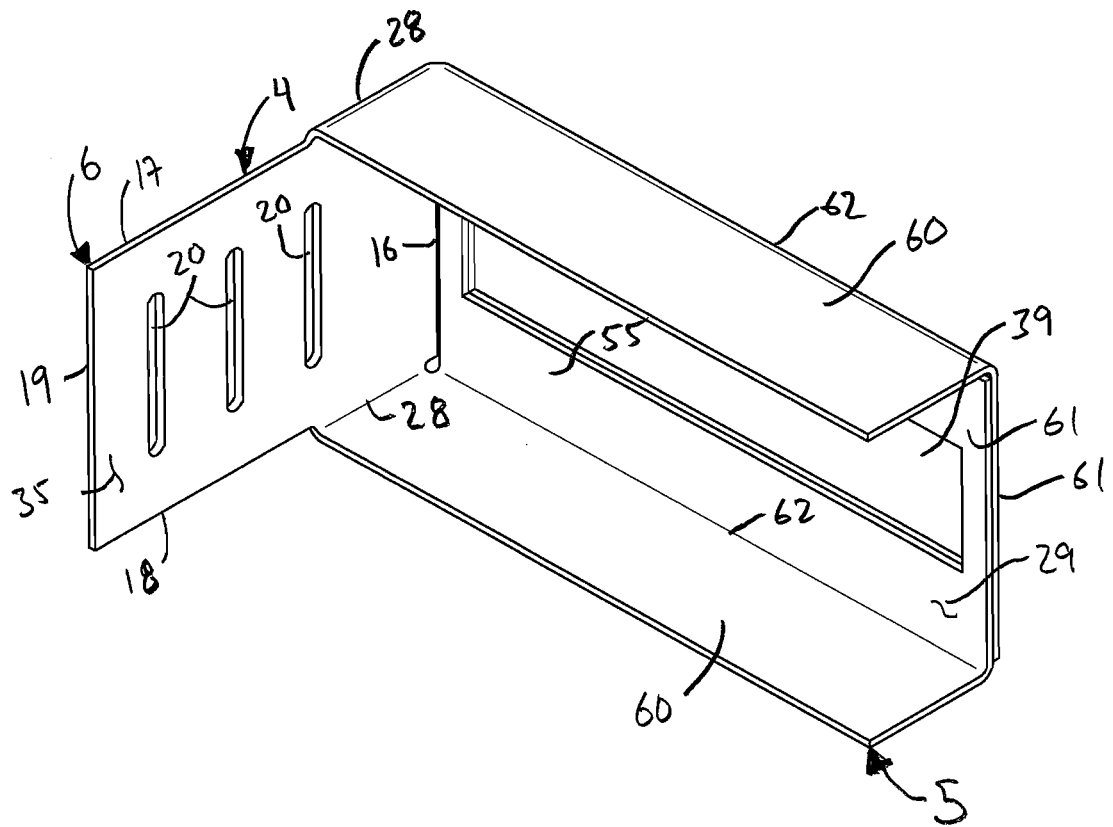
FIG. 5 is a perspective view of a drift clip of a connector of the present invention. The slider is not shown.
Figure 6:
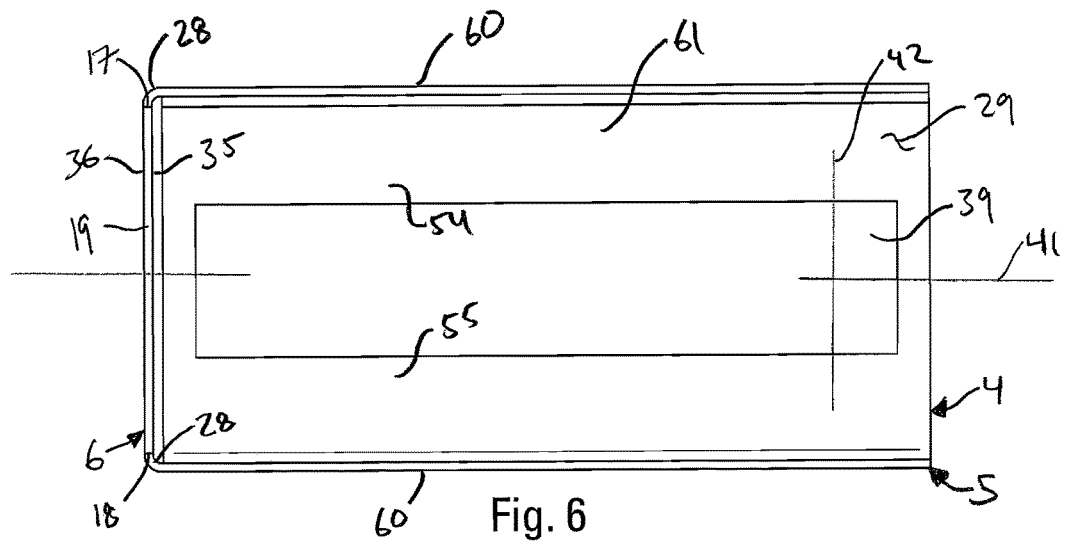
FIG. 6 is a front view of the drift clip of FIG. 5.
Figure 7:
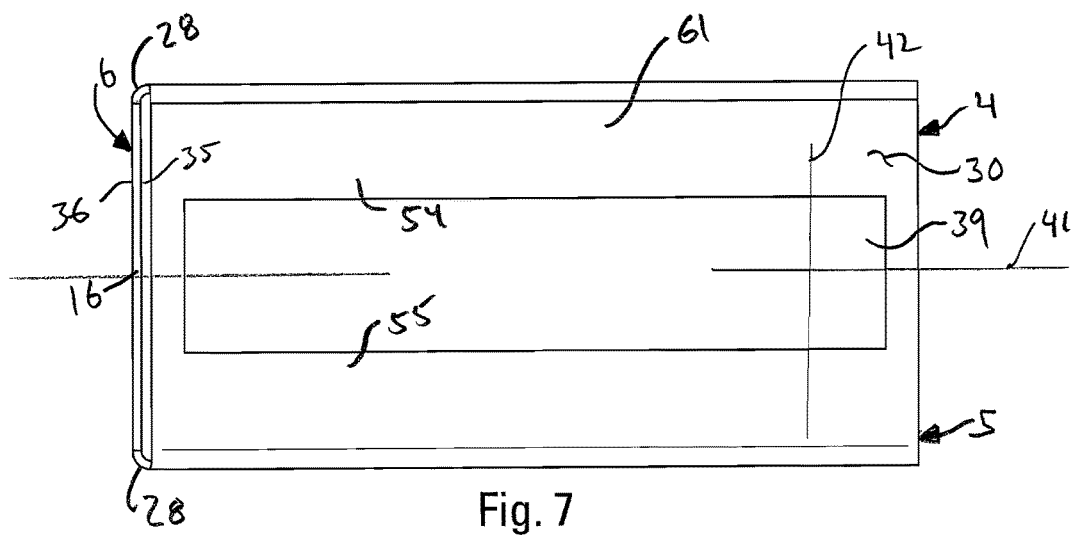
FIG. 7 is a back view of the drift clip of FIG. 5.
Figure 10:
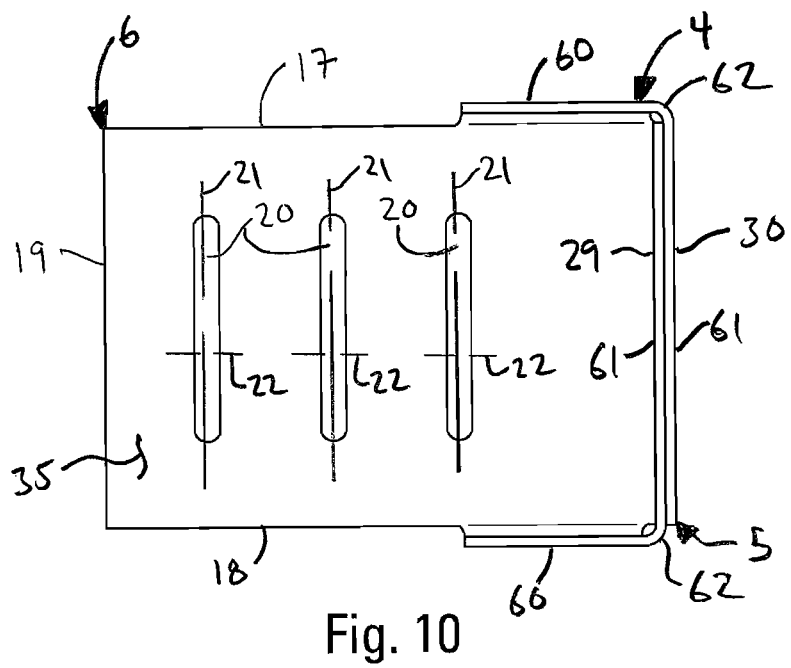
FIG. 10 is a left side view of the drift clip of FIG. 5.
Figure 11:
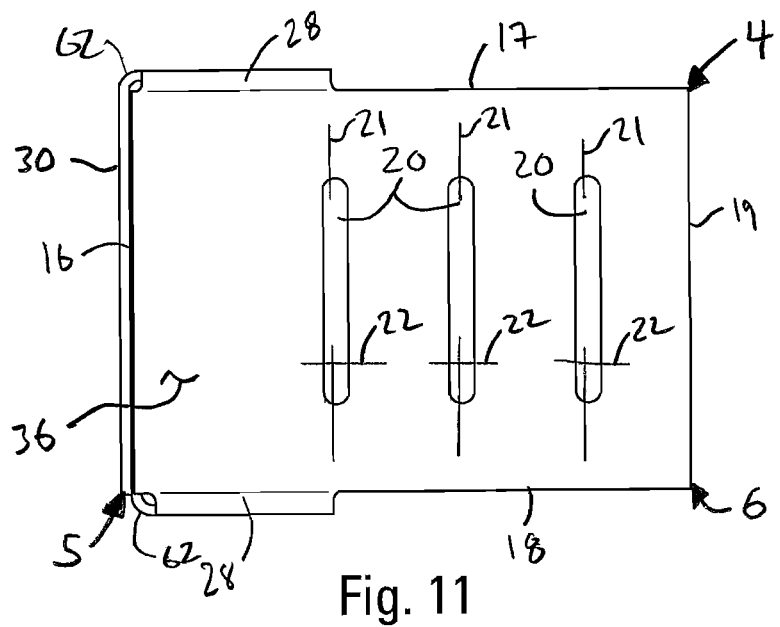
FIG. 11 is a right side view the drift clip of FIG. 5.
Figure 12:
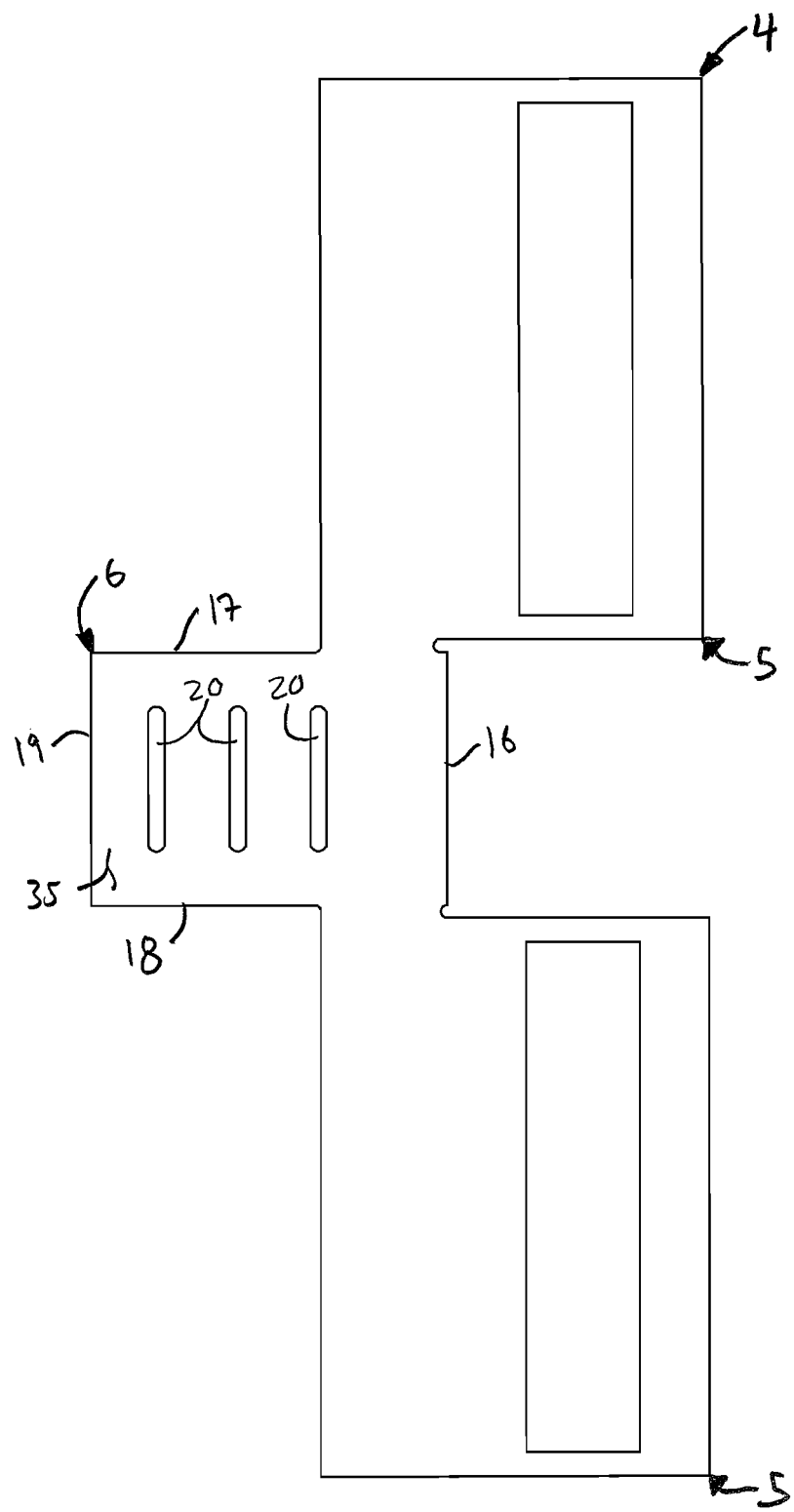
FIG. 12 is a top view of the blank used to form the drift clip of FIG. 5.

As shown in FIGS. 5 and 6, the anchored leg 6 preferably has an inner edge 16, a top edge 17, a bottom edge 18 opposed to the top edge 17, and an outer edge 19. The anchored leg 6 is formed with one or more openings 20. Preferably, the openings 20 of the anchored leg 6 are a plurality of elongated slots 20 disposed in parallel arrangement. As shown in FIGS. 10 and 11, each elongated slots 20 has a major axis 21 along which the slots are elongated, and a minor axis 22 that is disposed orthogonally to the major axis 21. Preferably the slots 20 are parallel with respect to their major axes 21. As shown in FIG. 5, the major axes 21 of the elongated slots 20 project along the direction in which relative movement between the mounting clip 4 and the supported member 3 is desired. Typically, as shown, the desired movement is vertical movement.

Figure 4:
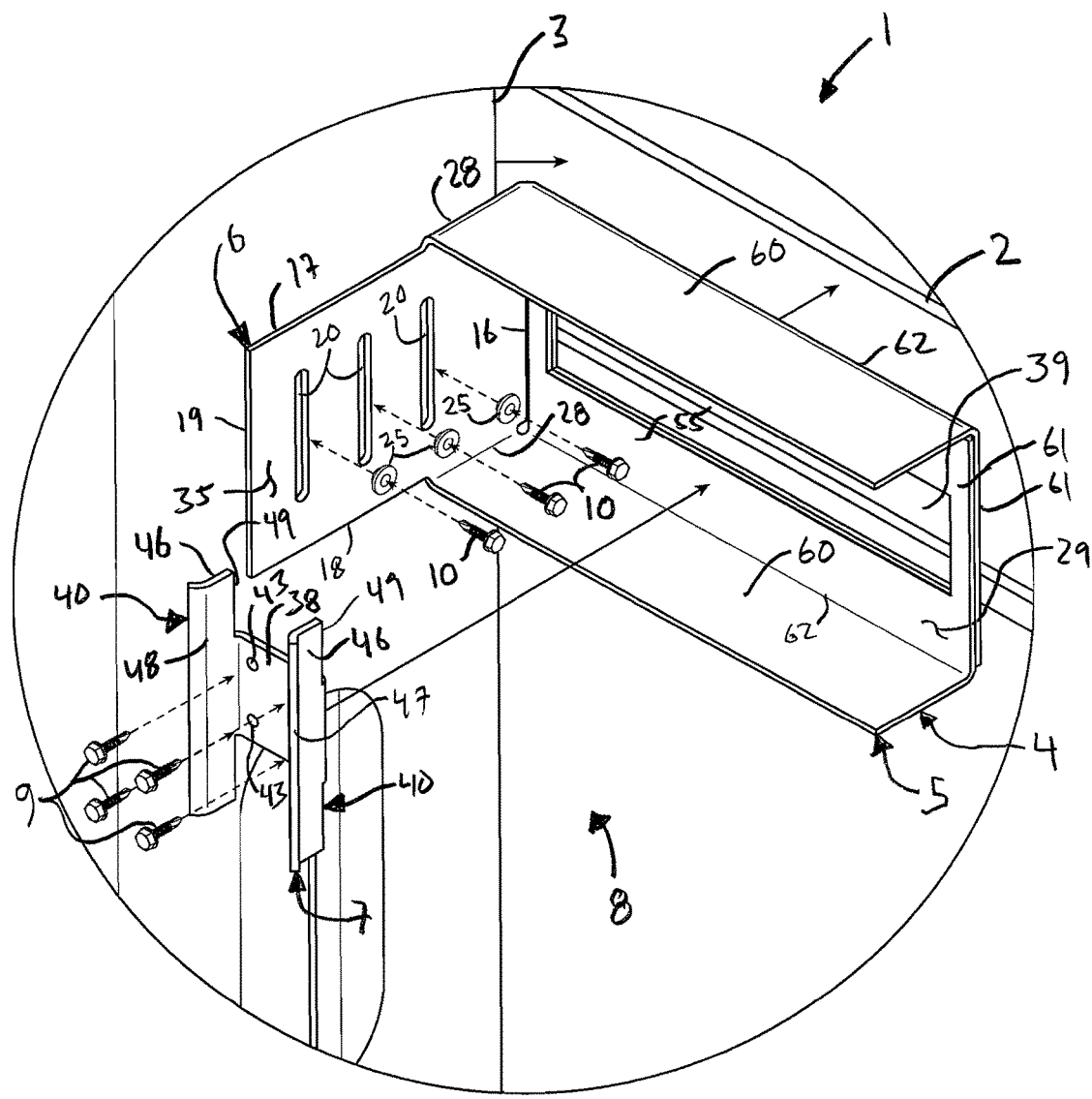
FIG. 4 is an exploded, detail perspective view of the connection of FIG. 1, taken along line FIG. 4 of FIG. 2.

As shown in FIG. 1, the anchored leg 6 of the mounting clip 4 is formed with elongated slots 20 for relative vertical movement between the anchored leg 6 and the supported member 3. Fasteners 10 attach the anchored leg 6 to the supported member 3. As shown in FIG. 1, when the fastener 10 is drilled into or connected to the stud or supported member 3, the fastener 10 is anchored in the stud 3. When the stud 3 moves relative to the supporting member 2, the fasteners 10 move in the elongated slots 20. Preferably, the fasteners 10 that attach the anchored leg 6 to the supported member 3 screw into the supported member 3. The preferred fasteners 10 for attaching the mounting clip 4 through elongated slots 20 are shouldered, or stepped-shank, self-drilling screws or are simple screws used with shouldered or un-shouldered bushings 25. FIG. 4 shows the fasteners 10 using shouldered bushings 25. Shouldered screws may have a head, an unthreaded shank portion immediately below the head, and a threaded shank portion below the unthreaded shank portion. The unthreaded shank portion or the bushing 25 located underneath the head which is smaller than the opening 20 allows the supported member 3 and the fasteners 10 attached to it to move relative to the anchored leg 6 without interference between the fasteners 10 and the anchored leg 6 of the mounting clip 4. The fastener 10 is preferably designed to drill itself into the web of the stud 3. The fastener 10 is connected to the stud 3 in a manner that it does not clamp down on the anchored leg 6. The shoulder on the screw or the bushing can be tall enough to prevent the shouldered portion or the head of the fastener 10 from clamping the anchored leg 6. The web of the stud 3 is preferably a substantially planar member.

As shown in FIGS. 5-12, the anchoring leg 5 is attached to the anchored leg 6, preferably by lateral bends 28 formed in the connector 4. The anchoring leg 5 is joined to portions of the top and bottom edges 17 and 18 of the anchored leg 6 at bends 28. Preferably, bends 28 are relatively short-radius 90 degree bends. The anchoring leg 5 has a sliding surface 29 and an interfacing surface 30 facing in the opposite direction. As shown in FIG. 1, the interfacing surface 30 interfaces with the supporting member 2.

The anchored leg 6 is preferably formed with a preferably planar front surface 35 and a preferably planar back surface 36 facing in the opposite direction. As shown in FIG. 1, the back surface 36 of the anchored leg 6 faces the supported member 3 and interfaces with a preferably planar portion of the supported member 3.

Figure 13:
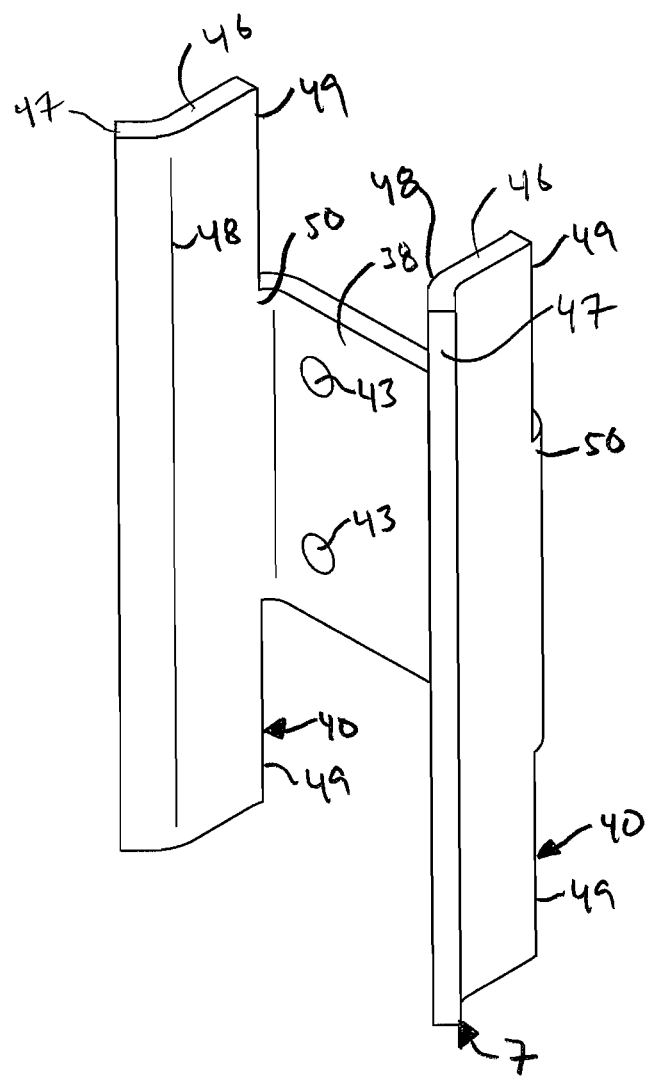
FIG. 13 is a perspective view of a slider of the present invention.
Figure 14:
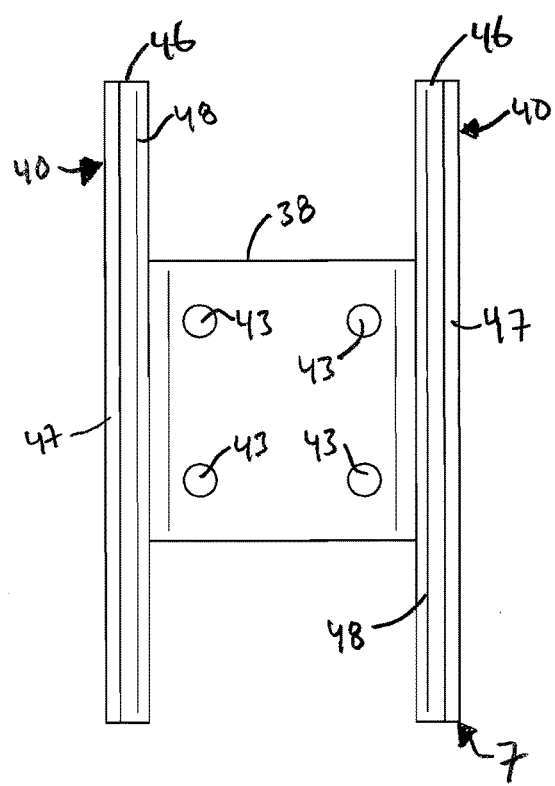
FIG. 14 is a top view of the slider of FIG. 13.

As shown in FIG. 1, in a preferred embodiment, the anchoring leg 5 is connected to the supporting member 2 by a slider 7. The slider 7 is rigidly secured to the supporting member 2 such that it cannot move with respect to the supporting member 2. The slider 7 is preferably a unitary member with the components of the slider 7 bent from a single piece of sheet metal. As shown in FIG. 1, the slider 7 connects the anchoring leg 5 to the supporting member 2 such that the anchoring leg 5 can move with respect to the supporting member 2. As shown in FIG. 13, the slider 7 preferably has one or more base components 38 that are disposed in the one or more elongated opening or slots 39 of the anchoring leg 5 and at least one securing component 40 that prevents the anchoring leg 5 from disengaging from the supporting member 2. The one or more elongated slots 39 in the anchoring leg 5 have major axes 41 along which the one or more slots 39 are elongated and minor axes 42 set orthogonally to the major axes 41. The sides of the one or more openings 39 that receive the one or more base components 38 of the slider 7 are arranged to allow the base components 38 to move relative to the one or more openings 39. The width of the one or more openings 39 is such that one or more base components 38 can travel the substantial length of the one or more openings 39. As shown the figures the sides of the one or more openings 39 are parallel and the sides of the one or more base components are also parallel 38.

Preferably, the one or more base components 38 are formed with fastener openings 43 to receive the fasteners 9 that attach the slider 7, as shown in FIG. 1 to the supporting member 2. The securing component 40 rises from the one or more base components 38 and overlies portions of the interfacing surface 30 of the anchoring leg 5. The one or more base components 38 are of a smaller dimension, both in the directions of the major axes 41 and the minor axes 42 than the one or more elongated slots 39 so that they can be received in and move with respect to the slots 39. Preferably, the one or more base components 38 fit closely within the one or more elongated slots 39 along their minor axis 42, while the base components 38 are preferably considerably smaller than the slots 39 along the major axes 41. The one or more openings 39 that receive the one or more base components 38 are larger than the one or more base components 38 so that the one or more base components 38 can move with respect to the one or more openings 39. Preferably, the base components or members 38 are elongated members which can have multiple points of contact along the one or more openings 39.

Figure 15:
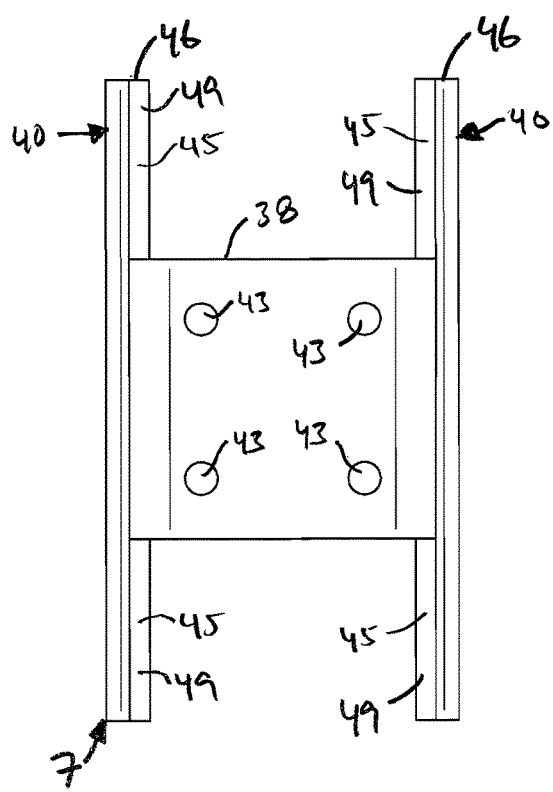
FIG. 15 is a bottom view of the slider of FIG. 13.
Figure 16:
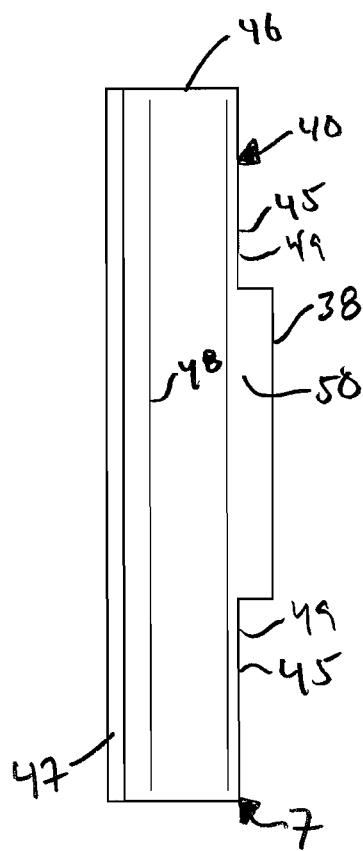
FIG. 16 is a front view of the slider of FIG. 13. The back view is the same.
Figure 17:
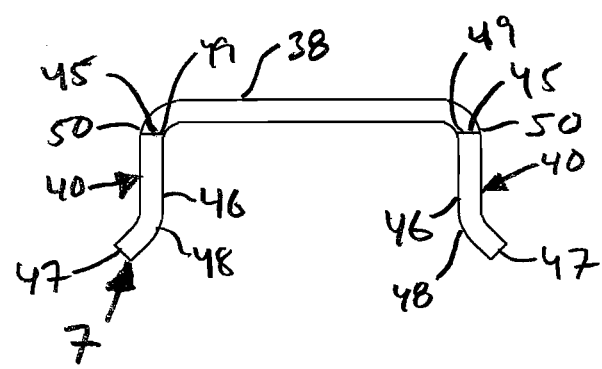
FIG. 17 is a side view of the slider of FIG. 13. The other side view is the same.

The one or more securing components 40 preferably have containment surfaces 45 that are in close proximity to portions of the interfacing surface 35 of the anchoring leg 5 to prevent the anchoring leg 5 from substantially pulling away from the supporting member 2. Preferably the containment surfaces 45 are disposed on either side of the slots 39. Preferably the securing component 40 is formed as one or more generally planar upstanding flanges 46 connected to and set at an angle to the one or more base components 38, such that a projection along the generally planar upstanding flange would intersect with the anchoring leg 5. Preferably, the upstanding flanges 46 are disposed generally orthogonally to the base components 38 and the anchoring leg 5. Preferably the one or more upstanding flanges 46 have an outer edge 47 and the upstanding flanges 46 are formed with lateral bends 48 or embossments to provide additional strength to the flanges 46. Preferably, the containment surfaces 45 are formed on the bottom edges 49 of the flanges 46, as best shown in FIGS. 15 and 16. The bottom edges 49 are generally opposed to the outer edges 47 of the flanges 46. The bottom edges 49 of the flanges 46 are interrupted by one or more projecting arms 50 that extend to and connect the one or more upstanding flanges 46 to the one or more base components 38.

Preferably, the anchored leg 6 has generally aligned portions 54 and 55 to the sides of the one or more openings 20 and 39, if relative sliding movement along the openings 39 is desired. With respect to the slider shown in FIG. 1, the aligned portions 54 and 55 are to the left and right of the openings 39 on the minor axis 42 of the openings 39 and the aligned sections 54 and 55 extend a substantial distance upwardly and downwardly along the major axes 41 of the openings 39. As shown in the figures, the aligned portions are also substantially planar, although they could be formed as contoured members and the containment surfaces could match the contour.

Figure 18:
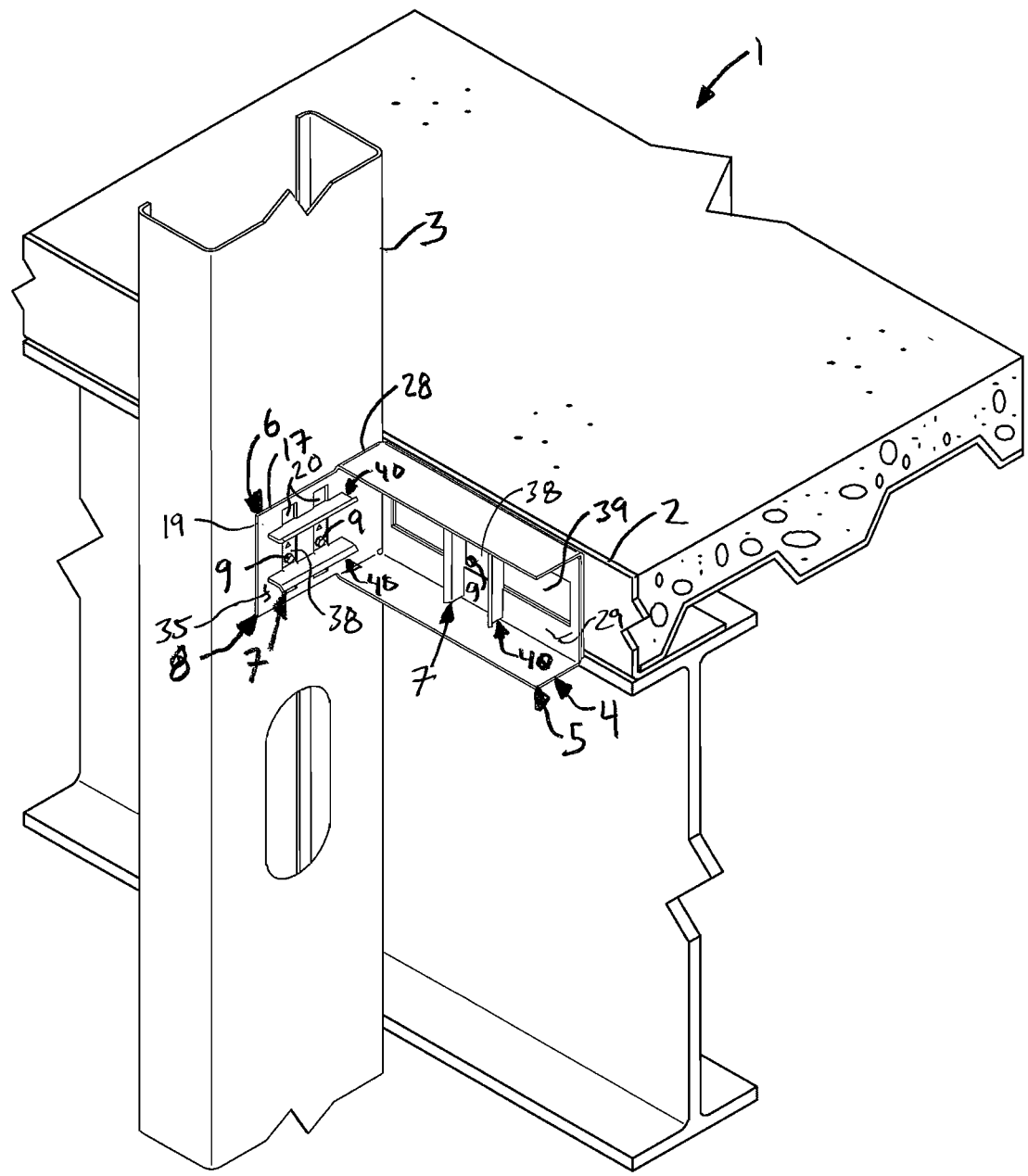
FIG. 18 is a perspective view of a connection formed according to the present invention.

As shown in FIG. 1, the slider 7 has one base component 38. As shown in FIG. 18, the slider can be formed with multiple base components 38 and the one or more securing components 40 can connect the multiple base components 38

The preferred fasteners 9 or 10 for attaching the connector 8 to a supporting member 2 made from steel are hex-head screws 9, automated power-actuated gun-driven fasteners 9 or, alternatively, welds 9, so long as they do not interfere with relative movement of the connector 8 and the supporting member 2. The preferred fasteners 9 or 10 for attaching the connector to a supporting member 2 made from concrete are concrete screws or anchors 9.

As shown in FIG. 1, the mounting clip 4 can be formed so that the anchored leg 6 is a unitary member having opposed side edges, the top and bottom edges 17 and 18, and the anchoring leg 5 is made of two overlapping members each of which is joined to one of the top and bottom edges 17 and 18 of the unitary member and are then bent so as to overlap. Each of the overlapping members is formed with a side flange 60 that is connected to one of the opposed side edges 17 and 18 of the unitary member at a bend line 28, and each of the overlapping members is formed with a back flange 61 connected to the side flange 60 at a bend line 62, and the back flanges 61 overlap. Each of the back flanges 61 are formed with one opening and the back flanges 61 overlap in such a manner that a single opening 39 is formed for receiving the one or more base members 38 of the slider 7. As shown the back flanges 61 of the overlapping members are generally rectangular and planar, and the side flanges 60 of the overlapping members are generally planar, and generally rectangular.

I claim:

1. A structural connection in a building, comprising:
   a. a supporting member;
   b. a supported member;
   c. a connector connecting the supported member to the supporting member, the connector including:
      i. a mounting clip having an anchored leg disposed in close proximity to the supported member, the anchored leg having a front surface and a back surface on opposite sides of the anchored leg with the back surface of the anchored leg facing the supported member, the anchored leg having one or more openings, and an anchoring leg connected to the anchored leg and disposed in close proximity to the supporting member, the anchoring leg having a sliding surface and an interfacing surface on opposite sides of the anchoring leg with the interfacing surface of the anchoring leg facing the supporting member, the anchoring leg having one or more openings; and
      ii. one or more sliders, the mounting clip being retained with respect to the one or more sliders so that the mounting clip is configured to move relative to the one or more sliders, the one or more sliders having one or more base components that are received in at least one of the one or more openings of the anchored leg and the one or more openings of the anchoring leg, the one or more openings that receive the one or more base components being larger than the one or more base components so that the one or more base components are configured to move with respect to the one or more openings, and a securing component that is attached to the one or more base components, the securing component having one or more containment surfaces that are disposed in close proximity to at least one of the front surface of the anchored leg when the one or more base components are received in the one or more openings of the anchored leg and the sliding surface of the anchoring leg when the one or more base components are received in the one or more openings of the anchoring leg, the securing component having one or more upstanding flanges connected to and set at an angle to the one or more base components and extending substantially above the one or more base components;
   d. one or more fasteners connect the one or more sliders to at least one of the supporting member and the supported member.

2. The connection of claim 1, wherein:
the base components are elongated members with multiple points of contact along the one or more openings that receive the base components.

3. The connection of claim 1, wherein:
the one or more upstanding flanges are formed with lateral bends or embossments to provide additional strength to the flanges.

4. The connection of claim 1, wherein:
   a. the one or more upstanding flanges are substantially parallel to each other, and
   b. the one or more upstanding flanges are disposed substantially orthogonally to the base components.

5. The connection of claim 1, wherein the one or more upstanding flanges have outer edges and one or more bottom edges that are substantially opposed to the outer edges and the containment surfaces are formed on the one or more bottom edges of the flanges.

6. The connection of claim 5, wherein the one or more bottom edges of the one or more upstanding flanges are interrupted by one or more projecting arms that extend to and connect the one or more upstanding flanges to the one or more base components.

7. The connection of claim 1, wherein:
the slider is a unitary member.

8. The connection of claim 7, wherein:
the base components are elongated members with multiple points of contact along the one or more openings that receive the base components.

9. The connection of claim 8, wherein:
one or more bottom edges of the one or more upstanding flanges are interrupted by one or more projecting arms that extend to and connect the one or more upstanding flanges to the one or more base components.

10. A structural connection in a building, comprising:
    a. a supporting member;
    b. a supported member;
    c. a connector connecting the supported member to the supporting member, the connector including:

i. a mounting clip having an anchored leg disposed in close proximity to the supported member, the anchored leg having a front surface and a back surface on opposite sides of the anchored leg with the back surface of the anchored leg facing the supported member, the anchored leg having one or more openings, and an anchoring leg connected to the anchored leg and disposed in close proximity to the supporting member, the anchoring leg having a sliding surface and an interfacing surface on opposite sides of the anchoring leg with the interfacing surface of the anchoring leg facing the supporting member, the anchoring leg having one or more openings;

ii. one of the anchoring leg and the anchored leg is a unitary member having opposed side edges and the other of the anchoring leg and the anchored leg is composed of two overlapping members each of which is joined to one of the opposed side edges of the unitary member and are bent so as to overlap; and iii. one or more sliders, the mounting clip being retained with respect to the one or more sliders so that the mounting clip is configured to move relative to the one or more sliders, the one or more sliders having one or more base components that are received in at least one of the one or more openings of the anchored leg and the one or more openings of the anchoring leg, the one or more openings that receive the one or more base components being larger than the one or more base components so that the one or more base components are configured to move with respect to the one or more openings, and a securing component that is attached to the one or more base components, the securing component having one or more containment surfaces that are disposed in close proximity to at least one of the front surface of the anchored leg when the one or more base components are received in the one or more openings of the anchored leg and the sliding surface of the anchoring leg when the one or more base components are received in the one or more openings of the anchoring leg;

d. one or more fasteners connect the one or more sliders to at least one of the supporting member and the supported member.

11. The connection of claim 10, wherein:
the securing component has one or more upstanding flanges connected to and set at an angle to the one or more base components.

12. The connection of claim 10, wherein:
each of the overlapping members is formed with a back flange, each of the back flanges are formed with one opening and the back flanges overlap in such a manner that a single opening is formed for receiving the one or more base components of the one or more sliders.

13. The connection of claim 10, wherein:
each of the overlapping members is formed with a side flange that is connected to one of the opposed side edges of the unitary member at a bend line; and
each of the overlapping members is formed with a back flange connected to the side flange at a bend line, and the back flanges overlap.

14. The connection of claim 13, wherein:
each of the back flanges are formed with one opening and the back flanges overlap in such a manner that a single opening is formed for receiving the one or more base components of the one or more sliders.

15. The connection of claim 10, wherein:
the slider is a unitary member.

16. The connection of claim 15, wherein:
the base components are elongated members with multiple points of contact along the one or more openings that receive the base components.

17. The connection of claim 16, wherein:
one or more bottom edges of the one or more upstanding flanges are interrupted by one or more projecting arms that extend to and connect the one or more upstanding flanges to the one or more base components.

18. The connection of claim 10, wherein:
the base components are elongated members with multiple points of contact along the one or more openings that receive the base components.

19. The connection of claim 18, wherein:
each of the overlapping members is formed with a side flange that is connected to one of the opposed side edges of the unitary member at a bend line; and
each of the overlapping members is formed with a back flange connected to the side flange at a bend line, and the back flanges overlap.

20. The connection of claim 19, wherein:
each of the back flanges are formed with one opening and the back flanges overlap in such a manner that a single opening is formed for receiving the one or more base members of the one or more sliders.

* * * * *